United States Patent

Huber et al.

Patent Number: 5,452,904
Date of Patent: Sep. 26, 1995

[54] STUFFING-BOX PACKING

[75] Inventors: Richard Huber, Modling, Austria; Peter Wirz, Unterkulm, Switzerland

[73] Assignee: Klinger AG, Zug, Switzerland

[21] Appl. No.: 11,402

[22] Filed: Jan. 29, 1993

[30] Foreign Application Priority Data

Aug. 2, 1991 [DE] Germany ............ 41 25 647.6

[51] Int. Cl.⁶ ............................................. F16J 15/16
[52] U.S. Cl. ..................... 277/123; 277/227; 277/234; 277/105
[58] Field of Search ....................... 277/105, 106, 277/110, 123, 125, 227, 233, 234, 124

[56] References Cited

U.S. PATENT DOCUMENTS

| | | | |
|---|---|---|---|
| 3,039,780 | 6/1962 | Nordel . | |
| 3,331,609 | 7/1967 | Moran | 277/123 |
| 4,256,317 | 3/1981 | Havens | 277/124 |
| 4,381,868 | 5/1983 | Croy et al. | 277/103 |
| 4,451,047 | 5/1984 | Herd et al. | 277/123 |
| 4,762,189 | 8/1988 | Tatum | 277/92 |

FOREIGN PATENT DOCUMENTS 3839792   5/1990   Germany .

*Primary Examiner*—Daniel G. DePumpo
*Attorney, Agent, or Firm*—Chilton, Alix & Van Kirk

[57] ABSTRACT

A stuffing-box packing for establishing a seal between a housing bore and a rotatable shaft which has at least one packing ring comprising expanded graphite and a pair of disc-shaped stripper elements which are comprised of a suitable plastic or metal. To ensure high tightness over a long service life, the packing ring is inclined relative to the radial plane of the shaft, is covered on both sides by a stripper element having an edge which makes coaxial and circumferential contact with the shaft, the laminate of packing ring and stripper elements is arranged between two support rings-which have oblique support surfaces inclined corresponding to the angle of inclination of the packing ring, and the thickness of the packing ring is such that the area of the shaft swept by the packing ring is at least almost completely subjected to the stripping action of the stripper elements.

8 Claims, 1 Drawing Sheet

STUFFING-BOX PACKING

BACKGROUND OF THE INVENTION

1. Field of the Invention

The present invention relates to the establishment of a fluid tight seal between a pair of relatively moveable parts between the inner diameter of a bore provided in a housing and a movable shaft which extends through that bore for example, and particularly to improving the performance of stuffing-box type packings which employ at least one packing ring which comprises expanded graphite. More specifically, this invention is directed to enhancing the service life of a sealing device which employs a packing ring comprising expanded graphite, the packing ring contacting a movable member. Accordingly, the general objects of the present invention are to provide novel and improved apparatus and methods of such character.

2. Description of the Prior Art

It is well known in the art to employ stuffing-box packings to prevent the leakage of fluid about movable shafts such as, for example, rotatable actuating spindles for valves. Such packings will often employ a packing ring which comprises expanded graphite, the packing ring contacting either or both of the spindle and the bore in the valve housing through which the spindle extends. It is also known to employ, in such packings, stripper elements which cooperate with the housing bore and/or the spindle. Such stripping elements are typically disc-shaped and may be comprised of plastic or metal.

Expanded graphite, particularly at relatively low strength, is known to have a tendency to adhere to surfaces. Accordingly, in the environment of a stuffing box packing there is a risk of graphite particles becoming separated from the packing ring and remaining adhered to the opposite surfaces which are to be sealed by the packing, i.e., the actuating spindle and the housing bore. Any such adhering particles may, on further rotary movement of the spindle, cause damage to the surface of the packing ring and thus compromise its ability to perform the requisite sealing function. The same problem, incidentally, is presented by other soft sealing materials of high adhesion and low strength. For most applications of stuffing-box packings, the adherence of particles of graphite or the like to the surface of a movable member about which a seal must be established does not present an unacceptable operating condition. There are, however, critical applications where only the most minimal degradation of the seal can be tolerated. As an example of such an application, environmental regulations may require that the escape of toxic media into the atmosphere be reliably prevented. In such instances, even the extreme of placing the sealing device within a bellows fails to afford adequate protection because, should there be a rupture of the bellows, a major release of toxic material could occur.

An example of a prior art stuffing-box packing which includes an expanded graphite packing ring and disc-shaped stripper elements may be seen from published German Application No. 3,839,792. In the packing of this published application, the component which establishes the seal is comprised of annular "foil" discs of expanded graphite and metal which have been stacked alternately and pressed together. Annular "foil" discs comprised of a metal fabric or plastic fabric and filled with a lubricant can additionally be interposed between the discs of expanded graphite and metal to enhance performance. Such interposed annular fabric discs, while primarily provided for the purpose of lubrication, also perform the function of stripping graphite particles which are detached from the graphite disc due to the low strength of expanded graphite. However, the stripping action which results does not affect the entire zone which is occupied by the expanded graphite lamellae and thus is inadequate. Restated, in a packing of the type disclosed in published German Application Number 3,839,792, even when fabric discs are interposed between the outer metal discs and the disc comprised of expanded graphite, the problem of seal degradation is not solved because no continuous stripping edges are provided and, accordingly, there is a risk that graphite particles will remain adhered to a surface which is designed to move relative to the graphite disc, i.e., the surface of a valve actuating spindle, and the seal will in time become impaired.

U.S. Pat. No. 3,039,780 discloses a different type of shaft seal wherein a pair of rubber sealing rings are arranged obliquely relative to the axis of the shaft about which a seal is to be provided. These rubber sealing rings are covered, on their end faces, by two porous, yielding felt discs. The felt discs serve to support the sealing rings and an oil-receiving chamber is located therebetween so as to provide lubrication.

SUMMARY OF THE INVENTION

The present invention overcomes the above-discussed and other deficiencies and disadvantages of the prior art by providing a novel technique for achieving a long lasting and reliable leak-proof seal about a movable shaft without requiring use of a liquid lubricant. The present invention also embodies a novel stuffing-box packing which implements this novel method and, in so doing, reliably insures the integrity of the seal over a long service life.

A stuffing-box packing in accordance with the present invention employs a packing ring comprised of a solid lubricant, particularly expanded graphite, which has a pair of parallel faces which are inclined at a preselected angle of inclination relative to the radial plane of the shaft to be sealed. This packing ring is sandwiched between, and preferrably covered on both sides by, stripper elements which include contact portions which extend completely about the shaft. The portions of the packing ring and stripper elements which contact the shaft to be sealed are arranged coaxially to the shaft surface. The packing ring with the stripper elements, and in some cases including further packing rings separated by stripper elements, is arranged between a pair of support rings. These support rings are provided, on their mutually facing end faces, with oblique surfaces which are inclined at an angle which corresponds to the selected angle of inclination of the packing ring. On their opposite end faces, i.e., the faces which are directed away from the laminate of packing ring and stripper elements, the support rings extend in radial planes relative to a shaft to be sealed. Additionally, in accordance with the present invention, the thickness of the packing ring is chosen so that the area of the shaft which is swept thereby during rotation is at least almost completely subjected to the stripping action of the stripper elements. This construction insures that any graphite particles which may adhere to a movable surface contacted by the packing ring will be removed from that surface by the stripper elements whereupon such particles will settle again on the shell surface of the packing ring(s). Such stripping during one full rotation of the shaft, or oscillatory pivoting, i.e., to-and-fro pivoting, has been found to greatly reduce the possibility of packing ring damage and thus to maintain the integrity of the seal for a long period of time.

The stripper elements employed in accordance with the present invention can be comprised of metal, and particularly a metal such as silver which is capable of sliding on a surface with minimum friction, or a suitable plastic, and particularly a self-lubricating plastic such as FEP and especially PTFE. Also, the stripping elements are typically in the form of annular shaped discs, preferably fully cover the end faces of the packing ring or rings, and define an edge which is in circumferential contact with the part to be subjected to the stripping action.

BRIEF DESCRIPTION OF THE DRAWING

The present invention may be better understood, and its numerous objects and advantages will become appararent to those skilled in the art, by reference to the accompanying drawing wherein.

DESCRIPTION OF THE DISCLOSED EMBODIMENT

Figure 1:
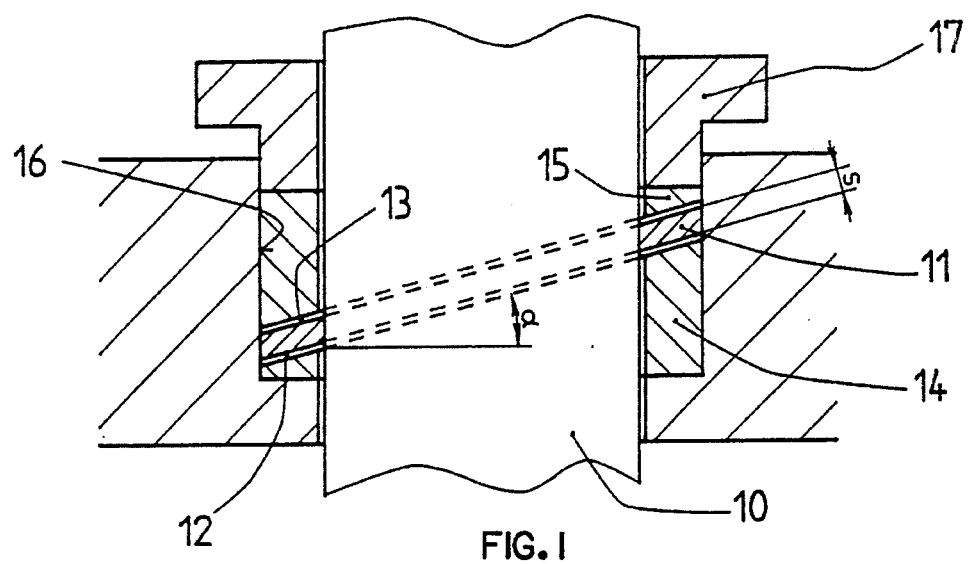
FIG. 1 is a cross-sectional view of a stuffing-box packing in accordance with the invention.

With reference to FIG. 1, a stuffing-box packing in accordance with the invention comprises a packing ring 11 which is inclined at an angle α with respect to the radial plane of a rotatable shaft 10 which is to be sealed. Packing ring 11 is comprised of expanded graphite and, for example, will be produced by pressing graphite up to a density of 1.8 g/cm$^3$ in a press mold. Stripper elements 12, 13, in the form of annular discs, are provided in contact with the opposite faces of packing ring 11. The stripper discs may, for example, be comprised of PTFE. The stripper discs and packing ring have outer and inner contact surfaces which extend coaxially with respect to shaft 10 and which respectively bear against the wall of a bore 16 in a housing and the shaft 10 thus establishing a seal between the shaft and the housing.

The laminate comprising the packing ring 11 and the annular stripper discs 12, 13 is mounted between a pair of support rings 14 and 15. The facing surfaces of support rings 14 and 15 are angled as shown so that these surfaces are complementary to the laminate. The support rings 14 and 15 are received in the housing bore 16 and are retained in position by means of a stuffing-box gland 17.

Figure 2:
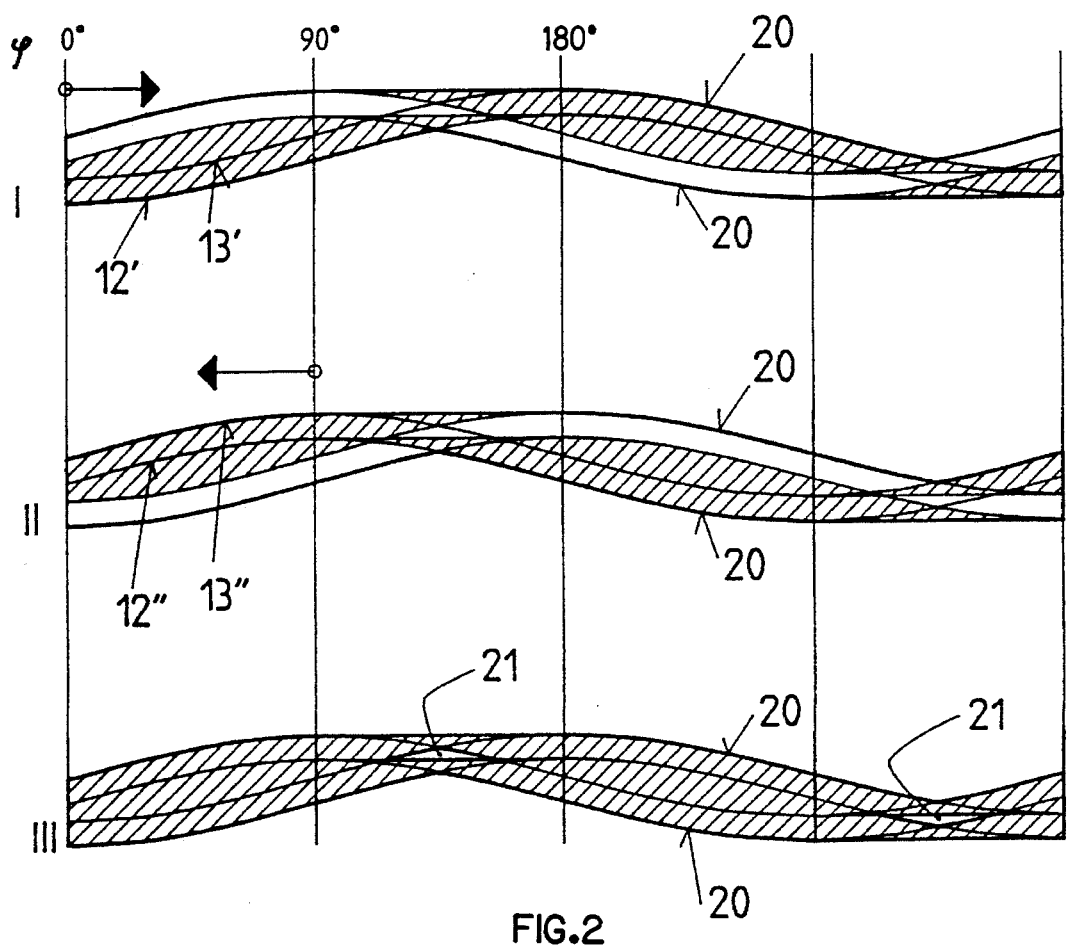
FIG. 2 graphically depicts the contact conditions between the packing of FIG. 1 and a rotary shaft.

FIG. 2 is a graphical representation of the contact conditions between the shaft 10 and the coaxial contact surface of packing ring 11 of the embodiment of FIG. 1. In FIG. 2, the areas of contact between the contact surfaces of the annular stripper discs 12 and 13 and shaft 10 are respectively represented by lines 12' and 13'. As may be seen from FIG. 2, as shaft 10 rotates, the regions where contact between the stripper elements and shaft surface occur have a sinusoidal pattern as a result of the angular orientation of the discs. In FIG. 2, the region between the lines 12' and 13' represents the developed area of the surface of shaft 10 which is contacted by the coaxial contact surface of packing ring 11. Thus, FIG. 2 clearly shows the "image" on the developed shaft surface swept by the surface of the packing ring 11 during rotation of the shaft. The resulting outer boundary of the contact surface swept by packing ring 11 during shaft rotation is represented in FIG. 2 as a thick line 20. The annular discs 12, 13, which are comprised of PTFE in the disclosed embodiment, act as strippers which wipe graphite particles from the surface of shaft 10. The shell surface section defined by discs 12 and 13, during this wiping action, is at any time at the rear in the direction of movement of the surface of shaft 10. In FIG. 2, the conditions which occur during clockwise rotation of shaft 10 are depicted in graph I wherein the hatched areas represent the area of shaft 10 subjected to the stripping action by the shell surface sections of discs 12 and 13. The conditions which arise during counterclockwise pivoting of shaft 10 are depicted in graph II. The surfaces of shaft 10 swept during an oscillatory movement, i.e., double pivoting, and subjected at least once to the stripping action are shown cross-hatched in graph III as the sum of the stripped areas of graphs I and II.

With the indicated angle of inclination α and a thickness s of packing ring 11, oscillatory movement of shaft 10 will result in small residual areas 21 which are not subjected to the stripping action of discs 12 and 13. In order to eliminate the areas 21, the thickness s of packing ring 11 would have to be smaller than or equal to:

$$s = r(1 - \cos \psi/2) \times \tan \alpha \tag{1}$$

where r = the radius of shaft 10; and

ψ = the angle through which shaft 10 is pivoted. Tests have shown, however, that in actual practice the packing does not precisely obey formula (1) and a packing ring thickness which is approximately twice that which would satisfy equation (1) provides adequate sealing and stripping.

It should be noted that the performance of a packing in accordance with the present invention can be improved by employing a plurality of the packing rings 11. In one reduction to practice, a packing in accordance with the present invention employed two packing rings 11 separated by an annular disc and having, at the opposite free ends, stripper discs 12 and 13. In this embodiment, the thickness s of the packing rings was 3.5 mm and the angle of inclination α was 15°. Also, the outer diameter of the packing rings was 70 mm while the inner diameter was 50 mm. In a comparative helium leak test under cold conditions, with a pressure differential of 40 bar, the following leakage rates were observed on the low-pressure side:

| Actuations | Normal, radially arranged packing ring covered by PTFE annular discs | Packing ring according to the invention |
| --- | --- | --- |
| 0 | $5.10^{-7}$ mbar · l · sec$^{-1}$ | $1.10^{-7}$ mbar · l · sec$^{-1}$ |
| 10,000 | $5.10^{-1}$ mbar · l · sec$^{-1}$ | $1.10^{-5}$ mbar · l · sec$^{-1}$ |

The above test results show that in the "normal" or prior art seal the leakage rates are initially higher than observed with the present invention and these leakage rates dramatically increase after usage in the case of the prior art packing. Indeed, the leakage rates using the "normal" packing increase to such an extent that, for most applications where toxic gases are involved, adequate sealing would not be maintained. It is also noteworthy that the torque required for actuation of the sealed shaft in the pressurized state decreased in the case of the "normal" seal from 100 Nm to 15 Nm due to the attrition which arises and which also manifested itself by a deepening of the inner shell. In the seal of the present invention, the torque decreased only from 85 Nm to 45 Nm as a result of the self-lubricating action of the PTFE strippers.

Referring again to equation (1) above, theoretically a thickness s of 1.96 mm is required for complete stripping without any residual areas 21. The above-reported test results show that a packing ring with almost twice the theoretically required thickness still provides a very good sealing action. Accordingly, even with rotary or pivotal movements of a shaft 10 in a housing or the like, the shaft being sealed with packing rings 11 containing expanded graphite or the like, the present invention provides a very high degree of sealing if the stripper elements 12, 13 are included in the stuffing-box packing and these excellent results are maintained even if axial shaft movement is superimposed upon the rotary movement.

While a preferred embodiment has been shown and described, various modifications and substitutions may be made thereto without departing from the spirit and scope of the invention. Accordingly, the present invention has been described by way of illustration and not limitation.

What is claimed is:

1. A stuffing-box packing for establishing a seal between two parts which are movable relative to one another, the parts to be sealed respectively having a wall region defining a housing bore and a rotatable shaft which is arranged therein, said packing comprising:

at least a first packing ring, said packing ring comprising expanded graphite and having outer and inner surfaces, at least one of said outer and inner surfaces bearing against one of said parts and having an area of contact therewith which extends completely about said ring, there being relative movement between said ring and said one part, said ring also having opposite side surfaces which define generally parallel planes, said packing ring side surface defined planes being inclined at an angle of inclination $\alpha$ relative to the radial plane of the shaft;

at least a pair of disc-shaped stripper elements, said stripper elements respectively being in contact with said opposite side surfaces of said packing ring, said stripper elements also establishing continuous regions of contact with said one part about the region of contact between said one part and said packing ring, said stripper elements each sweeping an area of said one part during said relative movement;

a pair of support rings, said packing ring with said stripper elements being arranged between said support rings, said support rings having mutually facing end faces which define oblique surfaces inclined at said angle $\alpha$, the opposite end faces of said support rings extending in generally parallel planes; and said packing ring having a thickness smaller than or equal to approximately $2r(1-\cos \psi/2) \times \tan \alpha$, where r is the radius of the shaft to be sealed in the stripping zone and $\psi$ is the angle through which the shaft is pivoted, said thickness of said packing ring being such that the area of said one part to be swept by said packing ring during said relative movement will be at least almost completely subjected to stripping action by contact with said regions of contact with said stripper elements.

2. The stuffing-box packing of claim 1 wherein said stripper elements completely cover the side surfaces of said packing ring.

3. The stuffing-box packing of claim 2 wherein said stripper elements are comprised of PTFE.

4. The stuffing-box packing of claim 2 wherein said stripper elements are comprised of silver.

5. A stuffing-box packing for establishing a seal between two parts which are movable relative to one another, the parts to be sealed respectively having a wall region defining a housing bore and a rotatable shaft which is arranged therein, said packing comprising:

at least a first packing ring, said packing ring comprising expanded graphite and having outer and inner surfaces, at least one of said outer and inner surfaces bearing against one of said parts and having an area of contact therewith which extends continuously about said ring, there being relative movement between said ring and said one part, said ring also having opposite side surfaces which define generally parallel planes, said packing ring side surface defined planes being inclined at an angle of inclination $\alpha$ relative to the radial plane of the shaft;

at least a pair of disc-shaped stripper elements, said stripper elements respectively being in contact with said opposite side surfaces of said packing ring, said stripper elements also establishing continuous regions of contact with said one part about the region of contact between the said one part and said packing ring whereby each of said stripper elements will sweep an area of said one part during said relative movement;

a pair of support rings, said packing ring with said stripper elements being arranged between said support rings, said support rings having mutually facing end faces which define oblique surfaces inclined at said angle $\alpha$, the opposite end faces of said support rings extending in generally parallel planes; and said packing ring having a thickness smaller than or equal to approximately $r(1-\cos \psi/2) \times \tan \alpha$, where r is the radius of the shaft to be sealed in the stripping zone and $\psi$ is the angle through which the shaft is pivoted, said thickness of said packing ring being such that the area to be swept by said packing ring during said relative movement will be at least almost completely subjected to stripping action by contact with said regions of contact with said stripper elements.

6. The stuffing-box packing of claim 5 wherein the said stripper elements completely cover the side surfaces of said packing ring.

7. The stuffing-box packing of claim 6 wherein said stripper elements are comprised of PTFE.

8. The stuffing-box packing of claim 6 wherein said stripper elements are comprised of silver.

* * * * *